United States Patent

Nuber et al.

[11] Patent Number: 6,152,385
[45] Date of Patent: Nov. 28, 2000

[54] COVERING DEVICE FOR AN OPENING IN THE OUTER SHELL OF A MOTOR VEHICLE

[75] Inventors: Walter Nuber, Goppingen; Manfred Huttner, Lenningen; Andreas Langer, Altbach, all of Germany

[73] Assignee: Daimler-Benz Aktiengesellschaft and Magna Pebra GmbH, Sulzbach, Germany

[21] Appl. No.: 08/928,664

[22] Filed: Sep. 12, 1997

[30] Foreign Application Priority Data

Sep. 12, 1996 [DE] Germany .................. 196 37 033

[51] Int. Cl.⁷ .................................................. B05B 1/10
[52] U.S. Cl. ............................. 239/284.2; 239/288
[58] Field of Search .................... 239/288, 288.5, 239/284.1, 284.2; 139/172

[56] References Cited

U.S. PATENT DOCUMENTS

| | | |
|---|---|---|
| 1,965,912 | 7/1934 | Strawn ..................... 239/288.3 X |
| 2,757,045 | 7/1956 | Nullet ........................ 239/288.3 X |
| 3,117,727 | 1/1964 | Pollock et al. ................ 239/284.2 |
| 4,331,299 | 5/1982 | Culbertson et al. ........... 239/288.5 X |
| 4,752,032 | 6/1988 | Costa et al. .................. 239/284.2 |
| 5,242,114 | 9/1993 | Camier et al. ................ 239/284.2 |
| 5,269,464 | 12/1993 | Epple et al. ................ 239/284.2 X |

*Primary Examiner*—Kevin Weldon
*Attorney, Agent, or Firm*—Antonelli, Terry, Stout & Kraus, LLP

[57] ABSTRACT

The invention relates to a covering device (1) for a spray nozzle passage opening (64) of a headlight washer system (66) for a motor vehicle. The covering device has a hinged door (14) which fits flush into a pivoting mounting frame (10) placed in the opening (64) and which, in the closed position under spring tension visibly covers the entire opening (64) in which the mounting frame (10) is inserted. In this way, the covering device (1) fits flush into the surrounding exterior skin (80), thus ensuring a smooth and even seam.

17 Claims, 3 Drawing Sheets

COVERING DEVICE FOR AN OPENING IN THE OUTER SHELL OF A MOTOR VEHICLE

BACKGROUND OF THE INVENTION

The invention relates to a covering device for an opening in the outer panel of a motor vehicle, specifically for the spray nozzle passage of a headlight washer system which is equipped with a hinged door on the visible surface of the surrounding outer panel, fitting flush and covering the opening in the closed position and which, in the released position, swings outwards from the opening on the visible surface of the outer panel.

There are covering devices known of this kind for headlight washer systems in vehicles in which the covering panel for a spray nozzle is fitted directly in the outer body of the vehicle in a swivel position near an opening and is held in the closed position by a torsion spring. The passage is located in the plastic trim in the area between the headlight cutouts in a headlight mounting arrangement. The disadvantage of this is that to facilitate installation in the trim, the cover panel must be aligned in the opening without undue stress, whereby the positional tolerance of the mounting locations must be kept to a minimum. Besides the increased difficulty in mounting and aligning a cover panel on the visible surface, it is difficult to avoid that an outer surface of plastic will warp, due to the effects of temperature and aging, so that sometimes a closure which was flush when installed will no longer close evenly after a certain amount of use. Similar problems also arise with other types of cover panels, typically for fuel tank filler pipes or retractable curb feelers.

SUMMARY OF THE INVENTION

Based on the foregoing, the purpose of the invention is to improve a covering device of known art as described, so that it is possible to have a long-term flush fit without extensive alignment procedures on any surface, but especially on the plastic outer surface of a car exterior.

The present invention provides a covering device for covering an opening in an outer panel or a motor vehicle, comprising a mounting frame which fits securely into the opening and a door hinged to the mounting frame. The door has a closed position, in which the door completely covers the mounting frame and the opening into which it fits, and a released position in which the door swings outwards from the opening.

The fundamental idea behind this invention is that the positioning of the panel in relation to the opening edge becomes independent of the fastening of the swivel bearing. In accordance with this invention it is proposed that this be realized by fitting the cover panel to a mounting frame which fits securely into the opening, such that in the closed position the panel closes the entire opening surrounding the frame. Due to the secure fit of the mounting the frame is easy to centre into the opening while the position of the cover panel remains independent of its fitting, so that an apparent seamless joint is achieved between the cover panel and the outer skin.

In an advantageous embodiment of the invention, the mounting frame can be fitted centred into the opening of the outer panel from behind and be secured to the outer panel by a joining device for a rigid fit. This is achieved by having the mounting frame at the front end which fits into the opening designed with an outer, stepped notch, whereby one outer stepped surface is adjacent to the outer panel, and whereby a projecting inner stepped surface fits flush in the opening and is covered by the covering panel, in the closed position, preferably leaving an even seam along the outer panel. In addition, the mounting frame can be fitted with mounting brackets on the side, which can be attached, preferably by expanding rivets, to mounting surfaces on the outer wall and projecting inside.

In a preferred embodiment of the invention, the covering panel, which covers the visible side of the opening is a trim plate preferably made of thermoplastic, and a rigid pivot support, which preferably is made of a fibreglass-reinforced plastic. With a proper paint finish on the trim plate an overall sturdy construction would be achieved.

The structure of the embodiment would preferably be a one-piece swivel mount, with a mounting plate fixed securely and flush to the trim plate and having at least one swivel arm formed onto the mounting plate fitted to one end of a swivel shaft fastened to the mounting frame.

In another advantageous embodiment of the invention, the swivel shaft is fastened to a bracket attached at the side close to a plane running parallel through the mounting frame, whereby at least one swivel arm is curved, overlapping an angle of about 180° and in the released position travelling through the interior cross section of the mounting frame and out. By maintaining as small a distance as possible between the frame surface and the swivel shaft parallel to it, overlapping of the path travelled by the covering panel and cutting across the outer skin will be avoided, so that a particularly small gap can be achieved between the trim plate and the outer shell. It is advantageous if the distance between the swivel shaft and the frame is kept great enough to keep the outward swinging curve of the covering panel to a small curvature.

To achieve a construction resistant to twisting, it is advantageous to have two swivel arms molded on opposite sides of the mounting frame and positioned at a slight distance from each other, whereby the unattached ends of the swivel arms are fitted with bearing recesses which can be easily fixed on shaft journals secured to the frame by expansion, so that a non-slipping rotating connection is achieved.

In order to achieve an even positioning of the covering panel in relation to the mounting frame, it is advantageous that at least one of the swivel arms and/or the mounting plate is fitted with centering lugs adjacent to the side of the mounting frame opposite the inner edge it touches in the closed position and which projects out at the side.

Advantageously, the mounting frame has several sections, preferably at the corner, projecting beyond the stepped surfaces, at the inner stepped surfaces which engage the opening. These corner sections are designed as spacers for the trim plate of the covering panel, so that freezing of the trim plate due to weather conditions can be avoided.

The hinged door has automatic centering in the closed position via a return spring which is mounted pretensioned between the hinged door and the mounting frame in a suitable manner. The covering panel can then be supported by the rigid mounting plate which rests in the interior cross-section of the mounting frame in the closed position, and the side away from the trim plate is positioned under spring tension on a stop face of the mounting frame.

It is of further advantage when the rear of the mounting plate away from the trim plate is fixed with an angled buffer formed by an edged beading, so that the operating mechanism of the motor vehicle can extend through the opening, thus pushing the hinged door outwards. This facilitates a smooth outward motion of the operating mechanism and at the same time the edged beading prevents any damage to the covering panel during the outwards movement.

In a preferred embodiment of the invention, the outer shell consists of a plastic facing of a bumper, where the opening provided for the passage of the spray nozzle of a headlight system is stamped out of the prefabricated facing.

The covering panel in accordance with this invention preferably is used with a headlight washer system for a motor vehicle, which has a spray head that is extendable through an opening in the front of the bumper facing by a lifting movement from its position of rest. It is advantageous thereby that the spray head has a sliding rib which acts together with an angled buffer on the covering panel during extension.

To minimize the amount of space required, it is of further advantage that the mounting plate for the covering panel has a recess at the rear into which the spray head fits in the rest position facing forward.

BRIEF DESCRIPTION OF THE DRAWINGS

In the following drawings the invention is further explained using a schematic representation. They show.

DETAILED DESCRIPTION OF THE PREFERRED EMBODIMENTS

Figure 1:
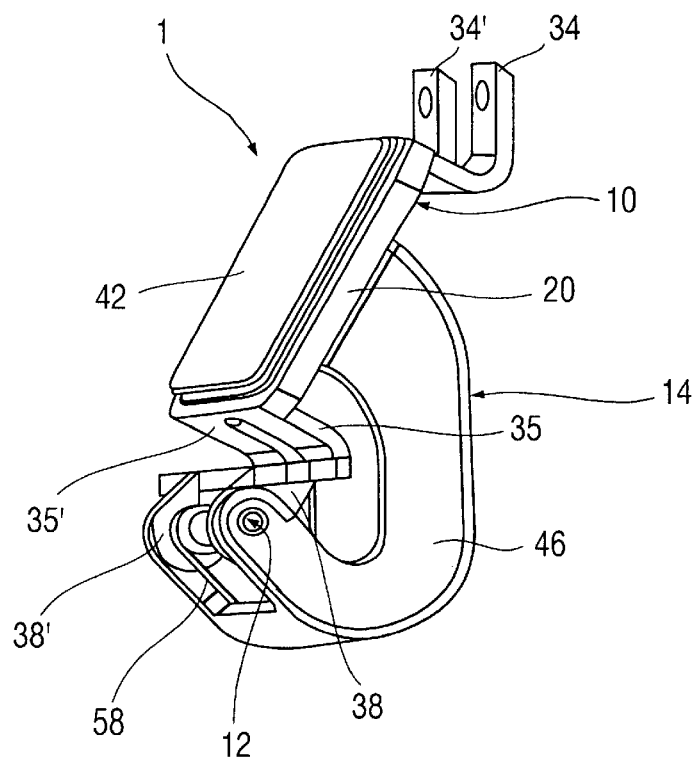
FIG. 1 a perspective view of a covering device for a headlight washer system for a motor vehicle.

The covering device 1 shown in the drawing serves to cover an opening for a telescoping, retractable spray nozzle assembly of a headlight washer system and it consists essentially of a mounting frame 10 which is fitted securely in the passage opening and of a hinged door 14 which is fitted to a swivel bearing 12 of the mounting frame.

The mounting frame 10 has four frame edges 16, 18, 20, 22 which are shaped to form a parallelogram for design reasons, and which at their front are provided with a lapped spacing 24 (FIG. 3), whereby an inner stepped surface 26 protrudes beyond an outer stepped surface 28. The inner stepped surface 26 has raised corner sections 30 which serve as spacers for the hinged door 14. The upper corner areas at the rear of the mounting frame 10 are reinforced with stop faces 32 against which the hinged door 14 abuts under spring tension while in the closed position.

Two brackets 34, 34' projecting upwards, are provided on the upper frame edge 22 to secure the mounting frame to the outer panel, while on the lower frame edge 18 a crosspiece 36 is fitted at the side on downwards projecting connecting flanges 35, 35'. Two brackets 38, 38' are joined to the extension of the connecting flanges 35, 35' on the crosspiece 36, and which at their unattached ends each are penetrated by a shaft journal and which together on the same shaft, form the swivel shaft 12 for the hinged door 14. The swivel shaft 12 thus lies parallel along frame edge 18 and in a plane covered by the area behind the lower frame edge of the mounting frame 10.

Figure 2:
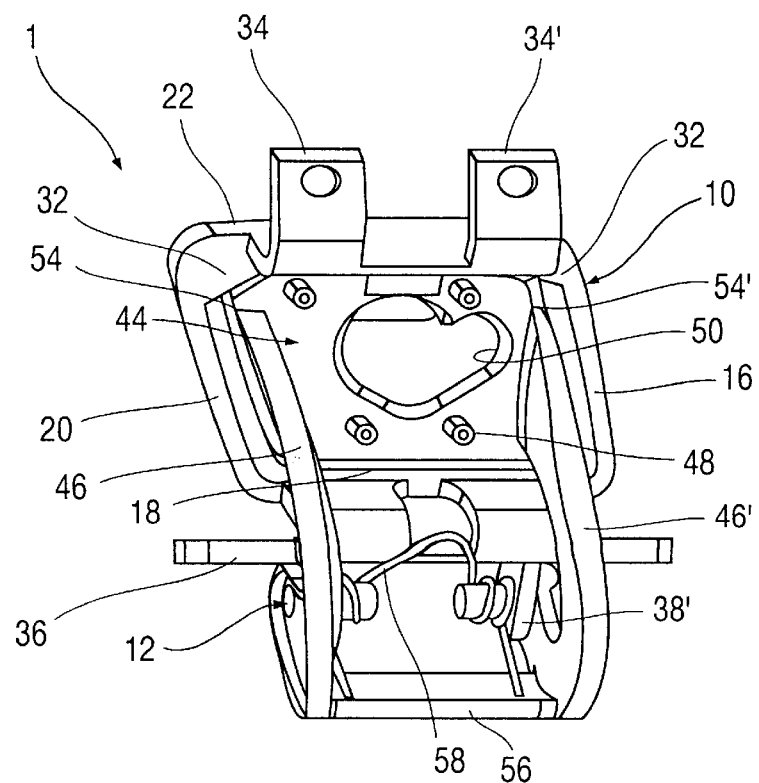
FIG. 2 the rear view of the covering device shown in FIG. 1 in perspective view.
Figure 3:
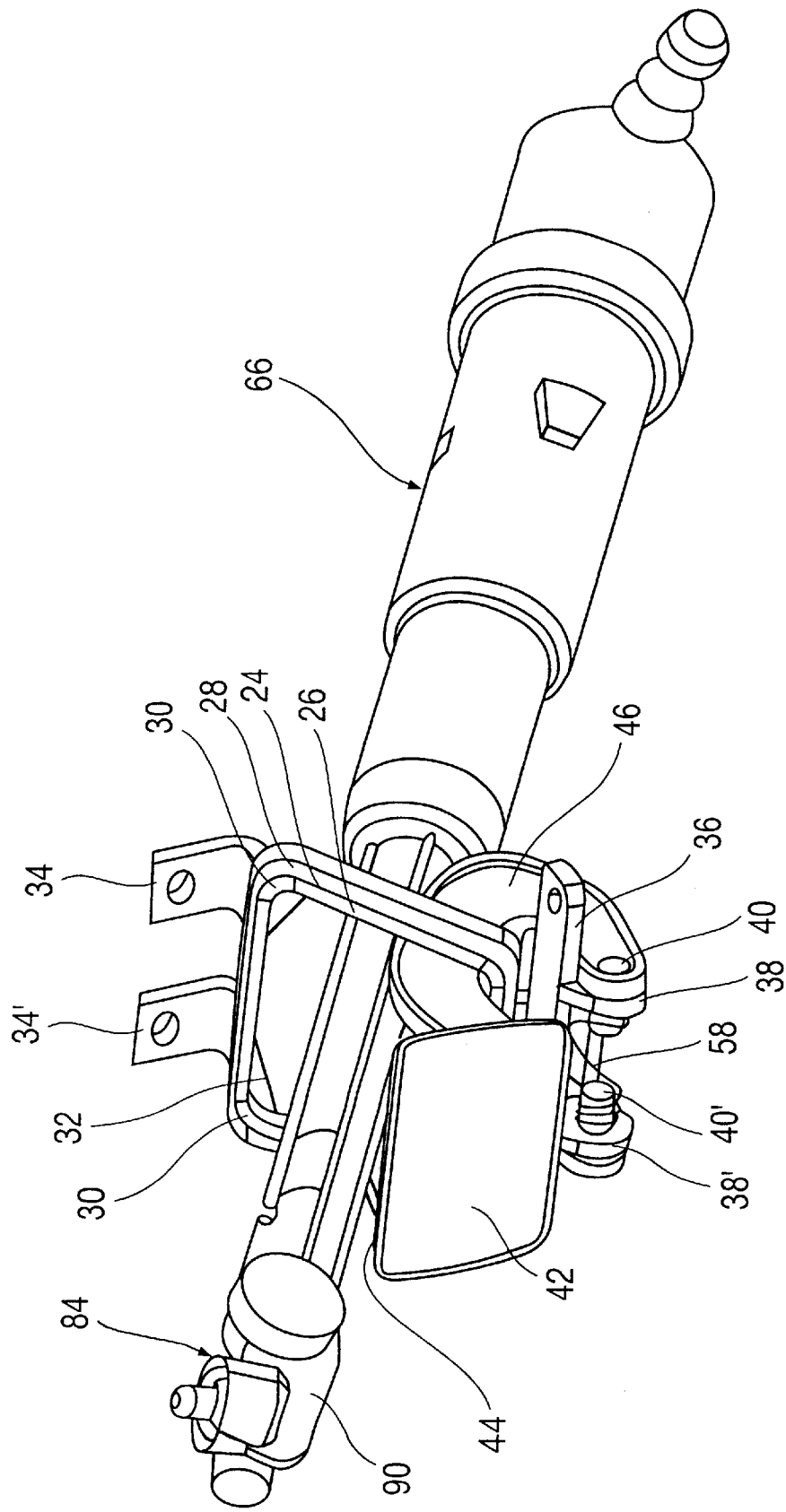
FIG. 3 a perspective view of the covering device from FIGS. 1 and 2 in a released position with the spray head of the headlight washer system in the extended position.

As can be seen particularly in FIGS. 1 to 3, the hinged door 14 consists essentially of a trim plate 42 and of a swivel support which is fixed securely to the trim plate. The swivel support is made up of the supporting plate 44 adjacent to the trim plate 42, as well as two swivel arms 46, 46' which are attached to opposite sides of the supporting plate 44 slightly separated from each other. The trim plate 42 is made of plastic that will take paint particularly well, while the swivel support is formed as a one-piece rigid shape, for example out of a fibreglass-reinforced plastic. On the rear of the trim plate 42 are protruding plastic rivets 48 which provide a secure fastening to the trim plate 42 by means of hot upsetting, so that there is no effect on the material of the trim plate that could affect its ability to hold a paint finish. In the closed position, the support plate 44 fits in the inner cross-section between the frame edges of the mounting frame 10 and has a recess 50 (FIG. 2) in the rear of the trim plate 42, as well as an upper edge beading 52 (FIG. 5), the function of which is detailed below. In order to centre the trim plate 42 in relation to the mounting frame 10, centering lugs 54, 54' project outward and to the side in the area of the joining locations between the swivel arms 46, 46' and the support plate 44, and which, in the closed position are located along the inner edge of frame edges 20 and 16.

The swivel arms 46, 46' are bent into a curve of about 180° and are connected together via a cross-piece 56. They can be retained on the shaft journals in the bearing openings 40, 40' by spreading their end pieces in such a way that they rest securely against either side of the brackets 38, 38'.

To maintain the spring tension on the hinged door 14 in its closed position, an operating lever spring 58 is attached to the two facing shaft journals 40, 40' and whose lever is placed pretensioned between the cross-piece 56 and the overhanging cross-piece 36 (FIG. 2). The covering device thus forms an interconnected assembly which allows for easy installation.

Figure 4:
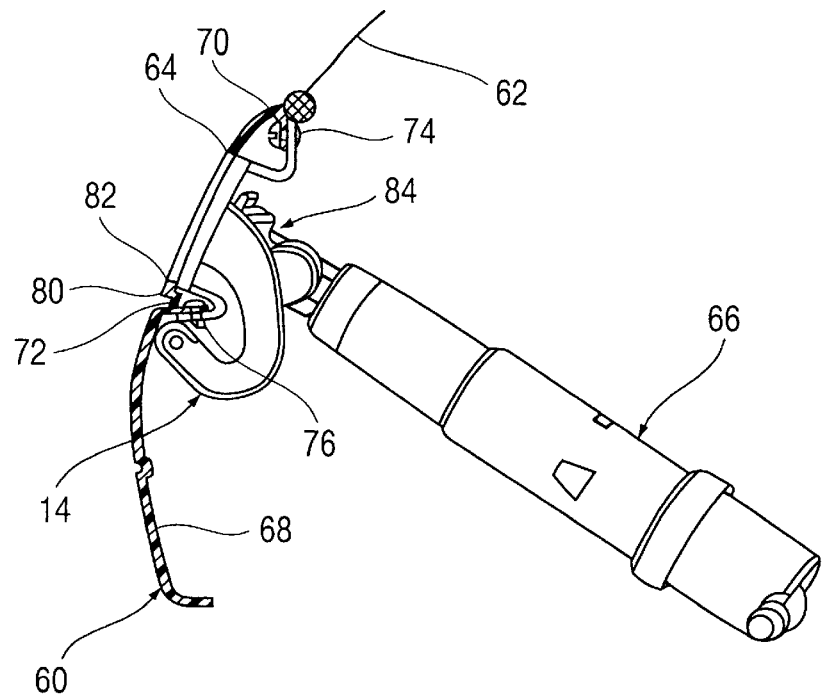
FIGS. 4, 5 a partial cut away side view of a covering device mounted in a bumper facing in the closed and open positions connected to a spray nozzle arrangement.
Figure 5:
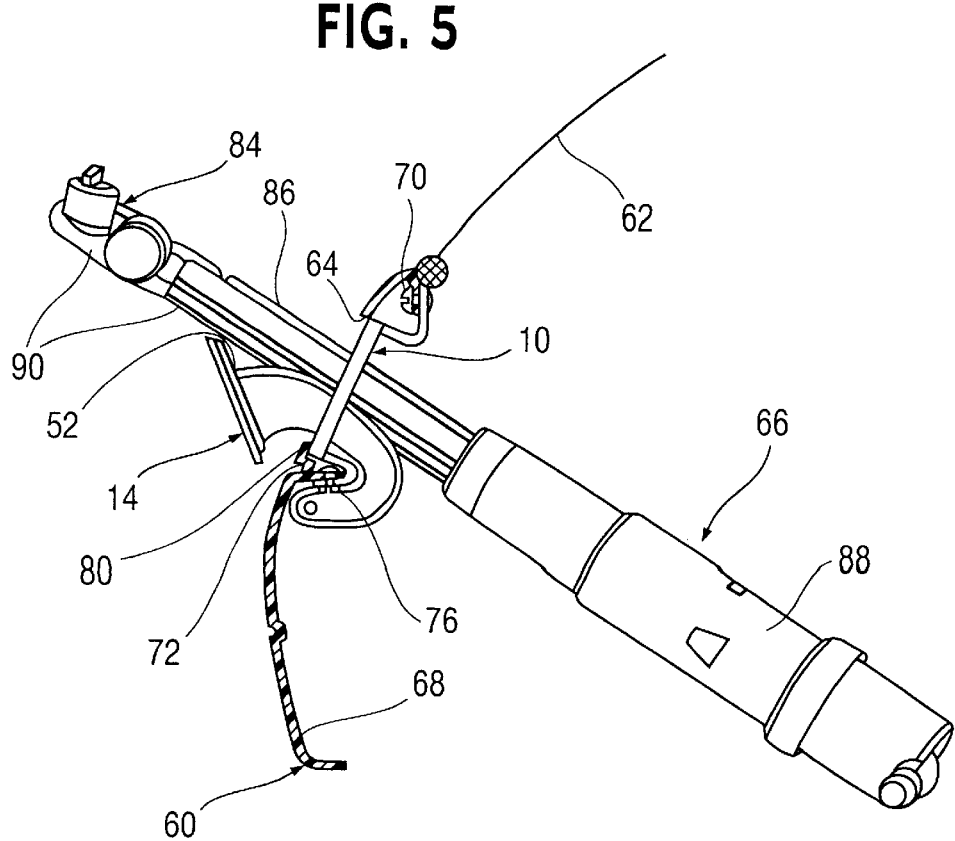

In FIGS. 4 and 5 the covering device 1 is shown in fitting position on a front bumper facing 60 of a passenger motor vehicle. The opening 64 for the spray assembly 66 is stamped out below a headlight lens 62 in the upper area of the bumper facing 60. The covering device is first flush mounted from the inside 68 of the bumper facing 60 with the stepped surface 24 of its frame 10 into the opening 64. Next, the brackets 34, 34' and the outlying cross-piece 36 are secured to the mounting surfaces 70 and 72 projecting inside by expanding rivets 74 and 76. The mounting frame 10 is thereby securely centered over the stepped surface 24 into the opening 64, and the trim plate 42 is then aligned flush with the frame 10 via the swivel carrier, so that the visible surface 78 of the trim plate 42 is flush with the visible surface 80 of the edge of opening 64 and the two leave an even seam 82 (FIG. 4).

The spray head 84 of the spray nozzle assembly 66, which is mounted behind the front cross member of the car body, not shown here, is located in FIG. 4 in its resting position inside the outer shell 66 of the vehicle body. In this position, which corresponds to the closed position of the hinged door 14, the front of the spray head projects into recess 50, which is similar in shape, behind the supporting plate 44 thereby optimizing its use of available space. FIG. 5 shows the operating position of the spray head 84 fitted at the free end of a piston rod 86 as it moves outward under pressure from the cylinder 88 through the opening 64 with a stroke action, whereby the hinged door 14 pushes against the force of the return spring 58 and opens outward. To prevent the spray head 84 from seizing during the lifting movement, both the spray head 84 and the piston rod 86 are provided with sliding ribs 90 underneath, which slide over the angled buffer on the edge beading, thereby avoiding damage to the upper edge of hinged door 14.

The spray head 84 retracts by means of a return spring. This action by the spring tension of return spring 58 also closes the hinged door 14 automatically into its closed position in the opening 64.

In summary, the following points can be stated: The invention relates to a covering device 1 for an opening 64 for the spray head of a headlight washer system 66 for motor vehicles. The covering device includes a hinged door 14 which fits flush into a mounting frame 10 placed in the opening 64 and which in its spring-tensioned closed position visually covers the mounting frame 10 fitted inside the opening 64. Through this arrangement, a smooth, flush mounting of the covering device 1 in the surrounding exterior skin 80 as well as a seamless joint is achieved.

What is claimed is:

1. A covering device for covering an opening in an outer panel of a motor vehicle, comprising a mounting frame which fits securely into the opening and a door hinged to the mounting frame, the door having a closed position, in which the door completely covers the mounting frame and the opening into which it fits, and a released position in which the door swings outwards from the opening.

2. Covering device according to claim 1, wherein the mounting frame is dimensioned to be set flush in the opening on an inner surface of the outer panel and rigidly fixed to the outer panel by joining devices.

3. Covering device according to claim 1, wherein the mounting frame has a stepped notch all around its facing edges along which an outer stepped surface is provided for fitting next to the outer panel and a projecting inner stepped surface is provided for fitting flush into the opening, the inner stepped surface being covered over in the closed position by the hinged door, leaving an even seam with the surrounding outer panel.

4. Covering device according to claim 1, wherein the mounting frame has brackets which can be fastened to inner protruding mounting surfaces on the outer panel by means of expanding rivets.

5. Covering device according to claim 3, wherein the hinged door which covers the opening has a trim plate, and rigid swivel carriers to which the trim plate is securely fastened.

6. Covering device according to claim 5, wherein the swivel carrier has a one-piece construction, and has a mounting plate next to and rigidly attached to the trim plate and has at least one swivel arm attached at one end to the mounting plate and at another end to a swivel shaft fitted to the mounting frame.

7. Covering device according to claim 6, wherein the swivel shaft is fastened to pivot brackets of the mounting frame and the least one swivel arm is curved with a curvature of about 180° and in the released position passes outward through the cross section of the mounting frame.

8. Covering device according to claim 6, wherein the swivel carrier has two swivel arms spaced at a short distance from each other and formed on opposite sides of the mounting plate, and wherein free ends of the swivel arms are provided with bearing holes, so that the free ends of the swivel arms can be spread to engage shaft journals attached to the frame.

9. Covering device according to claim 8, wherein at least one of the swivel arms and/or the mounting plate has a centering lug which in the closed position projects to the side and outwards on frame edges opposite the inner facing edges.

10. Covering device according to claim 5, wherein the mounting frame (10) at the inner stepped surface has several raised sections projecting beyond the stepped surface, at the corners and which are designed as spacers for the trim plate of the hinged door.

11. Covering device according to claim 6, wherein the swivel arm is held in the closed position by the tension of a return spring pretensioned between the hinged door and the mounting frame.

12. Covering device according to claim 6, wherein the mounting plate in the closed position sits in the inner cross-section of the mounting frame and that its rear rests by spring tension against a stop face of the mounting frame.

13. Covering device according to claim 6, wherein the rear of the mounting plate away from the trim plate is fitted with an angled buffer at an edge beading for an operating mechanism of the motor vehicle, extending through the opening and so pushing the hinged door outwards.

14. Covering device according to claim 1, wherein the outer panel is a plastic facing on a bumper, the opening is intended for a spray head of a headlight washer system, and the opening is stamped out of a prefabricated bumper facing.

15. Headlight washer system for a motor vehicle comprising spray head which extends from the rest position by a lifting stroke through an opening in an outer vehicle shell formed by a bumper facing into the spray position, and a covering device for the opening according to claim 1.

16. Headlight washer system as in claim 15, wherein the spray head has a sliding rib which acts together with an angle buffer on the hinged door when the spray head is extending.

17. Headlight washer system as in claim 15, wherein a back of the mounting plate of the hinged door has a recess into which the spray head retracts in the rest position facing forward.

* * * * *

(12) EX PARTE REEXAMINATION CERTIFICATE (5825th)
United States Patent
Nuber et al.

(10) Number: US 6,152,385 C1
(45) Certificate Issued: Jul. 24, 2007

(54) COVERING DEVICE FOR AN OPENING IN THE OUTER SHELL OF A MOTOR VEHICLE

(75) Inventors: Walter Nuber, Goppingen (DE); Manfred Huttner, Lenningen (DE); Andreas Langer, Altbach (DE)

(73) Assignees: Daimler-Benz Aktiengesellschaft, Stuttgart (DE); Manga Pebra GmbH, Sulzbach (DE)

Reexamination Request:
No. 90/006,759, Sep. 24, 2003

Reexamination Certificate for:
Patent No.: 6,152,385
Issued: Nov. 28, 2000
Appl. No.: 08/928,664
Filed: Sep. 12, 1997

(30) Foreign Application Priority Data

Sep. 12, 1996 (DE) .......................... 196 37 033

(51) Int. Cl.
*B05B 1/10* (2006.01)
*B06B 1/46* (2006.01)
*B62D 25/24* (2006.01)
*B62D 25/00* (2006.01)
*B60S 1/46* (2006.01)

(52) U.S. Cl. ................ 239/284.2; 239/284.1; 239/288

(58) Field of Classification Search ............ None
See application file for complete search history.

(56) References Cited

U.S. PATENT DOCUMENTS

| | | | | | |
|---|---|---|---|---|---|
| 2,173,890 | A | * | 9/1939 | Tuttle ......................... | 296/215 |
| 3,614,136 | A | * | 10/1971 | Dent .......................... | 280/500 |
| 4,138,152 | A | * | 2/1979 | Prue .......................... | 293/117 |
| 4,570,986 | A | * | 2/1986 | Sams ......................... | 293/117 |
| 4,586,738 | A | * | 5/1986 | Butler et al. ................. | 293/107 |
| 4,867,047 | A | * | 9/1989 | Citron ........................ | 454/347 |
| 4,961,604 | A | * | 10/1990 | Kisner ........................ | 293/106 |
| 5,460,420 | A | * | 10/1995 | Perkins et al. ............... | 293/106 |
| 5,799,991 | A | * | 9/1998 | Glance ........................ | 293/121 |
| 5,823,585 | A | * | 10/1998 | Tanguay ..................... | 293/106 |
| 5,855,094 | A | * | 1/1999 | Baudisch et al. ............. | 49/502 |

* cited by examiner

*Primary Examiner*—Davis Hwu

(57) ABSTRACT

The invention relates to a covering device (1) for a spray nozzle passage opening (64) of a headlight washer system (66) for a motor vehicle. The covering device has a hinged door (14) which fits flush into a pivoting mounting frame (10) placed in the opening (64) and which, in the closed position under spring tension visibly covers the entire opening (64) in which the mounting frame (10) is inserted. In this way, the covering device (1) fits flush into the surrounding exterior skin (80), thus ensuring a smooth and even seam.

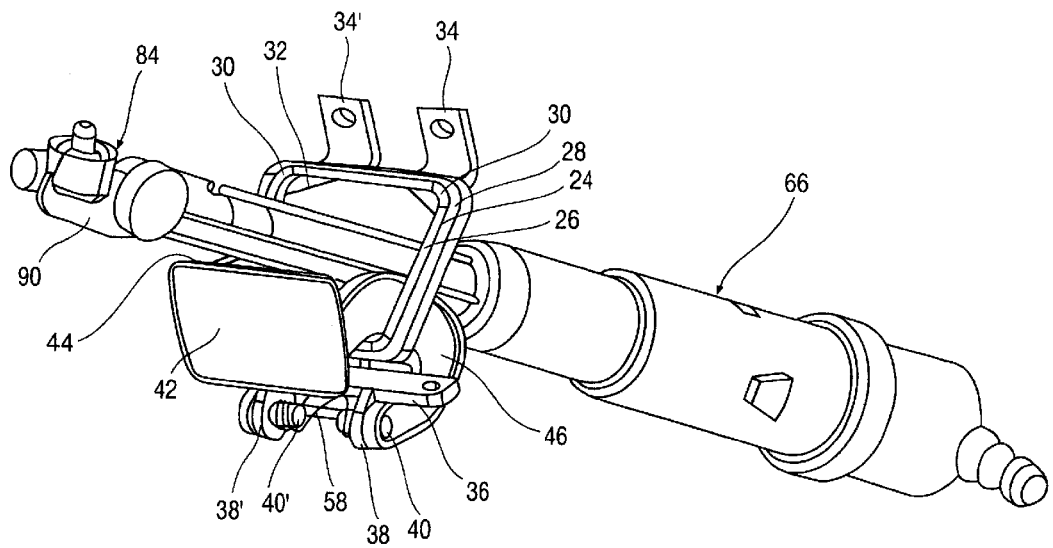

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4 and 14 are cancelled.

Claims 3 and 15 are determined to be patentable as amended.

Claims 5–13, 16 and 17 dependent on an amended claim, are determined to be patentable.

New claims 18–28 are added and determined to be patentable.

3. [Covering] *A covering* device [according to claim 1] *for covering an opening in an outer panel of a motor vehicle, comprising a mounting frame which fits securely into the opening and a door hinged to the mounting frame, the door having a closed position, in which the door completely covers the mounting frame and the opening into which it fits, and a released position in which the door swings outwards from the opening*, wherein the mounting frame has a stepped notch all around its facing edges along which an outer stepped surface is provided for fitting next to the outer panel and a projecting inner stepped surface is provided for fitting flush into the opening, the inner stepped surface being covered over in the closed position by the hinged door, leaving an even seam with the surrounding outer panel.

15. Headlight washer system for a motor vehicle comprising spray head which extends from the rest position by a lifting stroke through an opening in an outer vehicle shell formed by a bumper facing into the spray position, and a covering device for the opening [according to claim 1] , *the covering device comprising a mounting frame which fits securely into the opening and a door hinged to the mounting frame, the door having a closed position, in which the door completely covers the mounting frame and the opening into which it fits, and a released position in which the door swings outwards from the opening.*

*18 . A covering device for covering an opening in an outer panel of a bumper of a motor vehicle, comprising a mounting frame which fits securely into the opening and a door hinged to the mounting frame, the door having a closed position, in which the door completely covers the mounting frame and the opening into which it fits, and a released position in which the door swings outwards from the opening, wherein the mounting frame has brackets which can be fastened to inner protruding mounting surfaces on the outer panel by means of expanding rivets.*

*19. A covering device for covering an opening in an outer panel of a bumper of a motor vehicle, comprising a mounting frame which fits securely into the opening and a door hinged to the mounting frame, the door having a closed position, in which the door completely covers the mounting frame and the opening into which it fits, and a released position in which the door swings outwards from the opening, wherein the mounting frame has a stepped notch all around its facing edges along which an outer stepped surface is provided for fitting next to the outer panel and a projecting inner stepped surface is provided for fitting flush into the opening, the inner stepped surface being covered over in the closed position by the hinged door, leaving an even seam with the surrounding outer panel.*

*20. Covering device according to claim 19, wherein the hinged door which covers the opening has a trim plate, and rigid swivel carriers to which the trim plate is securely fastened.*

*21. Covering device according to claim 20, wherein the swivel carrier has a one-piece construction, and has a mounting plate next to and rigidly attached to the trim plate and has at least one swivel arm attached at one end to the mounting plate and at another end to a swivel shaft fitted to the mounting frame.*

*22. Covering device according to claim 21, wherein the swivel shaft is fastened to pivot brackets of the mounting frame and the least one swivel arm is curved with a curvature of about 180 degree, and in the released position passes outward through the cross section of the mounting frame.*

*23. Covering device according to claim 21, wherein the swivel carrier has two swivel arms spaced at a short distance from each other and formed on opposite sides of the mounting plate, and wherein free ends of the swivel arms are provided with bearing holes, so that the free ends of the swivel arms can be spread to engage shaft journals attached to the frame.*

*24. Covering device according to claim 23, wherein at least one of the swivel arms and/or the mounting plate has a centering lug which in the closed position projects to the side and outwards on frame edges opposite the inner facing edges.*

*25. Covering device according to claim 20, wherein the mounting frame at the inner stepped surface has several raised sections projecting beyond the stepped surface, at the corners and which are designed as spacers for the trim plate of the hinged door.*

*26. Covering device according to claim 21, wherein the swivel arm is held in the closed position by the tension of a return spring pretensioned between the hinged door and the mounting frame.*

*27. Covering device according to claim 21, wherein the mounting plate in the closed position sits in the inner cross-section of the mounting frame and that its rear rests by spring tension against a stop face of the mounting frame.*

*28. Covering device according to claim 21, wherein the rear of the mounting plate away from the trim plate is fitted with an angled buffer at an edge beading for an operating mechanism of the motor vehicle, extending through the opening and so pushing the hinged door outwards.*

* * * * *